DEVICE FOR REDUCING TAPE FRICTION IN A VIDEO TAPE RECORDER

Filed April 8, 1963

INVENTORS
FRANCISCUS TH. BACKERS
JOHANNES H. WESSELS
THEODOOR M.A. LIPS
BY
AGENT

United States Patent Office 3,293,377

Patented Dec. 20, 1966

3,293,377

DEVICE FOR REDUCING TAPE FRICTION IN A VIDEO TAPE RECORDER

Franciscus Theodorus Backers, Johannes Hendrik Wessels, and Theodoor Maria Albert Lips, Emmasingel, Eindhoven, Netherlands, assignors to North American Philips Company, Inc., New York, N.Y., a corporation of Delaware Filed Apr. 8, 1963, Ser. No. 271,158

Claims priority, application Netherlands, Apr. 9, 1962, 277,005

6 Claims. (Cl. 179—100.2)

This invention relates to magnetic recording and reproducing apparatus and in particular to such apparatus adapted to magnetically record and reproduce high frequency signals, such as video signals.

One such device, designed to magnetically record video signals on a magnetic tape and to reproduce signals from said tape, comprises a stationary cylindrical drum around which the tape is helically wound. The drum consists of two parts separated by a gap; a magnetic head rotates in the gap and is located on the circumference of a rapidly rotating disc provided concentrically with the drum. The circumference of the drum may have one or more apertures therein and, during operation, a gas may be forced under pressure through the apertures between the tape and the outer circumference of the drum. A gas layer is thus formed between the tape and the drum which reduces the friction between the tape and the drum; this results in less wear of the tape and also reduces the tensile stress and the possibility of elongation of the tape. The gas used may be air.

It is evident that this device, utilizing gas under pressure and thus requiring a separate gas source, adds to the cost of the recorder and may present problems in both fabrication and operation.

It is a primary object of the invention to provide mechanically simple and effective means to reduce friction between the tape and the drum in a magnetic recorder.

It is a further object of the invention to reduce the friction between the tape and the drum without the use of a separate gas source.

According to one feature of the invention and in furtherance of the above objects, the gas supply is obtained by utilizing the air pressure created by the rotation of the disc.

According to another feature of the invention, the drum is composed of two sections, at least one of which encloses a hollow chamber communicating with the surrounding air, the air being forced axially through the chamber by the speed of rotation of the disc. Further, slots are provided in the drum circumference through which the air is forced between the tape and the drum.

Although the normal speed of rotation of the disc is generally sufficient to produce an excess air pressure of an amount enough to create the desired gas layer, a further aspect of the invention consists in providing the disc with blades in order to obtain a higher excess air pressure.

The above objects and features of the invention, as well as other more detailed ones, will become readily apparent from the following description when taken in conjunction with the drawings, in which.

Figure 1:
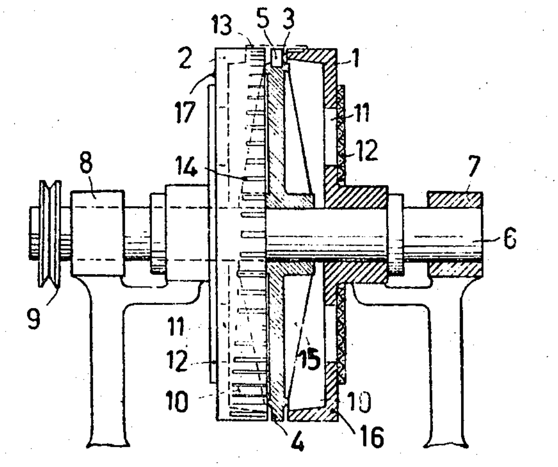
FIG. 1 is in part a longitudinal cross-section through, and in part a pictorial representation of, an apparatus for recording and/or reproducing video signals on a magnetic tape.

In the figures, in which like reference numerals denote like parts, two rigidly mounted drum sections are indicated by reference numerals 1 and 2; as can be seen most clearly in FIG. 1, sections 1 and 2 have flat end portions 16 and 17, respectively, and are separated by an air gap 3. A rapidly rotating disc 4 is provided between the drum sections 1 and 2. The disc 4 provided with a magnetic head 5, is mounted on a shaft 6 which is journalled at 7 and 8 and may be driven by a belt pulley 9 or another suitable motive source. It is seen that the disc 4 is concentric with the drum sections and extends outwardly from shaft 6 to the circumference of the drum.

The drum sections 1 and 2 are hollow; the hollow portions are herein called chambers and are designated by reference numeral 10. The chambers 10 communicate with the open air surrounding the apparatus by means of a plurality of apertures 11 provided in the flat end portions 16 and 17 of the drum sections as shown. A filter 12 may be provided over the apertures for filtering the air flowing in. A magnetic tape 13, commonly consisting of an insulating material coated with a magnetizable material, moves along a helical path on the outer circumference of drum sections 1 and 2 passing over the gap 3. The helical nature of the path is most clearly seen in FIG. 2.

Figure 2:
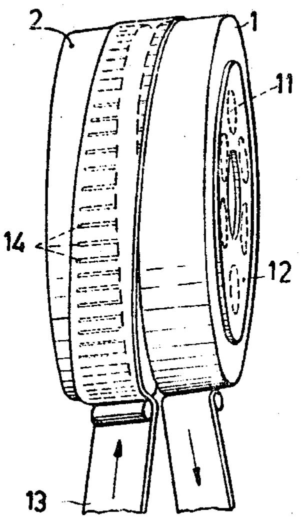
FIG. 2 is an isometric view of the same apparatus.
Figure 3:
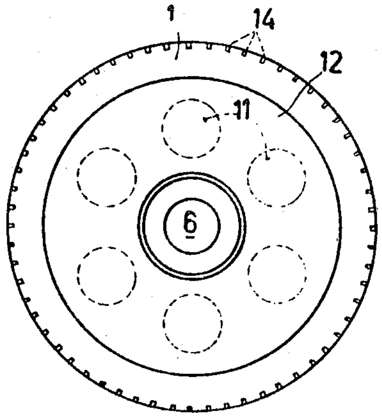
FIG. 3 is a side elevation of FIG. 1, the tape not being shown.

Slots 14 are provided in the circumference of each drum section and extend axially from the edge of the section facing the air gap 3. It is to be noted that the slots need not all be equal in length. As shown in FIGS. 1 and 2, the slots are unequal in length. The term "axially" is used to indicate that the slots are parallel to the axis of the device, which is the axis of shaft 6.

The ends of the slots remote from the air gap may lie along a helical path, approximately the path taken by the tape; they are thus shown in FIGS. 1 and 2. The length of the slots, however, is such that the tape at all times completely covers all the slots; in other words, the length of the slots is less than the portion of the bearing surface on the drum which is covered by the tape.

Figure 4:
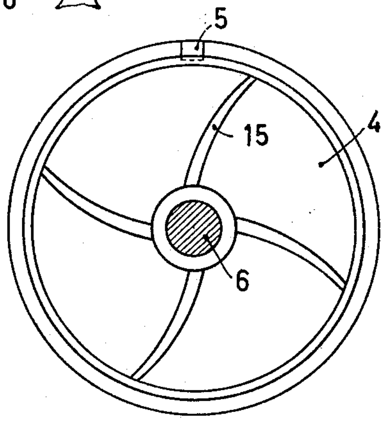
FIG. 4 shows one form which may be taken by the blades attached to the disc.

The rapidly rotating disc 4 may be provided with a plurality of blades 15 which serve to increase the excess air pressure still further. FIG. 4 shows one manner in which the blades may be advantageously shaped to secure a desired amount of excess air pressure. This is shown only by way of example, the particular shape of the blades forming no part of the invention.

If the apertures 11 and the slots 14 were omitted, then the tape 13, which moves extremely rapidly on the outer circumference of the drums 1 and 2, would experience a high degree of friction, thus increasing tape wear and producing uneven elongations in the tape; this would result in distortion of the recorded information. However, due to the inclusion of these elements, the rotation of the rapidly rotating disc 4 forces air into the chambers 10 through the apertures 11 and this air is further forced through the grooves 14; therefore, an air cushion or layer is formed between the tape 13 and the outer circumference of the drums 1 and 2.

Thus, the above-noted friction and elongation are considerably reduced. In addition, it is seen that no separate gas or air supply under pressure is required and the device of the invention is therefore more economical and simpler.

While the invention has been described in connection with one embodiment, it is evident that many modifications thereof will readily occur to those skilled in the art without departing from the inventive concept, the scope of which is set forth in the appended claims.

What we claim is:

1. A device for magnetically recording and reproducing signals on a tape, comprising: a stationary cylindrical drum having a chamber and a cylindrical periphery, a portion of said periphery being adapted to be traversed by a moving magnetic tape, a rapidly rotating disc located in said chamber, said disc being concentric with said drum, a magnetic head located on the circumference of said disc, said head magnetically co-acting with said tape, and at least one slot in the periphery of said drum, said slot communicating with the drum chamber and said tape, the rapid rotation of the disc forcing air through said slot and between the periphery of the drum and the tape.

2. A device for magnetically recording and reproducing signals on a tape, comprising: a stationary cylindrical drum having a chamber and a cylindrical periphery, a portion of said periphery being adapted to be traversed by a moving magnetic tape, a rapidly rotating disc located in said chamber, said disc being concentric with said drum and having a plurality of blades thereon, a magnetic head located on the circumference of said disc, said head magnetically co-acting with said tape, and at least one slot in the periphery of said drum, said slot communicating with the drum chamber and said tape, the rapid rotation of the disc and the blades thereon forcing air through said slot and between the periphery of the drum and the tape.

3. A device for magnetically recording and reproducing signals on a tape, comprising: a stationary cylindrical drum having a chamber, a cylindrical periphery and a flat end portion, said periphery being adapted to be traversed by a moving magnetic tape, a rapidly rotating disc located in said chamber, said disc being concentric with said drum, a magnetic head located on the circumference of said disc, said head magnetically co-acting with said tape, a part of said flat end portion being open and communicating with said chamber and the outside air, and at least one slot in the periphery of said drum, said slot communicating with the drum chamber and said tape, the rapid rotation of the disc forcing outside air through said slot and between the periphery of the drum and the tape.

4. A video tape recorder comprising: a stationary cylindrical drum consisting of two sections separated by an air gap, said drum having a chamber, a cylindrical periphery and flat end portions, said periphery being adapted to be traversed by a moving magnetic tape which moves in a helical path around said periphery, a rapidly rotating disc located in said chamber in the region of said gap, a magnetic head located on the circumference of said disc, said head rotating in said gap and magnetically coacting with said tape, and a plurality of slots in the periphery of each of said sections, said slots extending from said gap in the direction of said end portions and communicating with the drum chamber and said tape, each slot having a length which is shorter than that part of the axial periphery of the drum which is covered by the tape, the rapid rotation of the disc forcing air through said slots and between the periphery of the drum and the tape.

5. A video tape recorder comprising: a stationary cylindrical drum consisting of two sections separated by an air gap, said drum having a chamber, a cylindrical periphery and flat end portions, said periphery being adapted to be traversed by a moving magnetic tape which moves in a helical path around said periphery, a rapidly rotating disc located in said chamber in the region of said gap, a magnetic head located on the circumference of said disc, said head rotating in said gap and magnetically coacting with said tape, and a plurality of slots in the periphery of each of said sections, said slots extending from said gap in the direction of said end portions and communicating with the drum chamber and said tape, each slot being entirely covered by said tape, the rapid rotation of the disc forcing air through said slots and between the periphery of the drum and the tape.

6. A recorder as set forth in claim 5, wherein a plurality of air-directing blades are located on said disc.

References Cited by the Examiner

UNITED STATES PATENTS 2,998,495 8/1961 Maxey ---------- 179—100.2

BERNARD KONICK, *Primary Examiner.*

A. I. NEUSTADT, *Assistant Examiner.*